Sept. 21, 1943.  W. C. SPECK  2,329,794
CULTIVATOR ATTACHMENT
Filed April 8, 1943  3 Sheets-Sheet 1
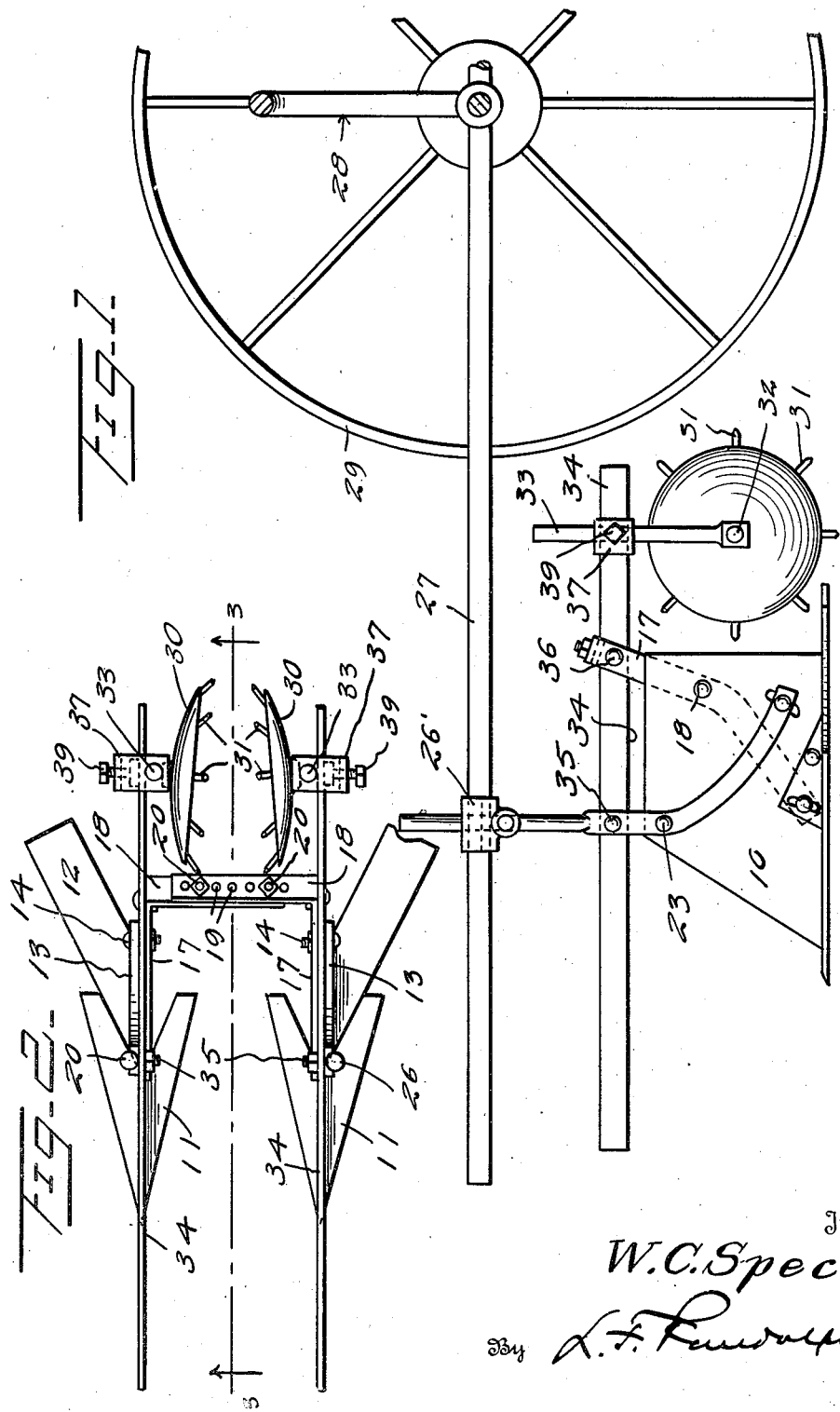
Inventor
W. C. Speck
By L. F. Randolph
Attorney

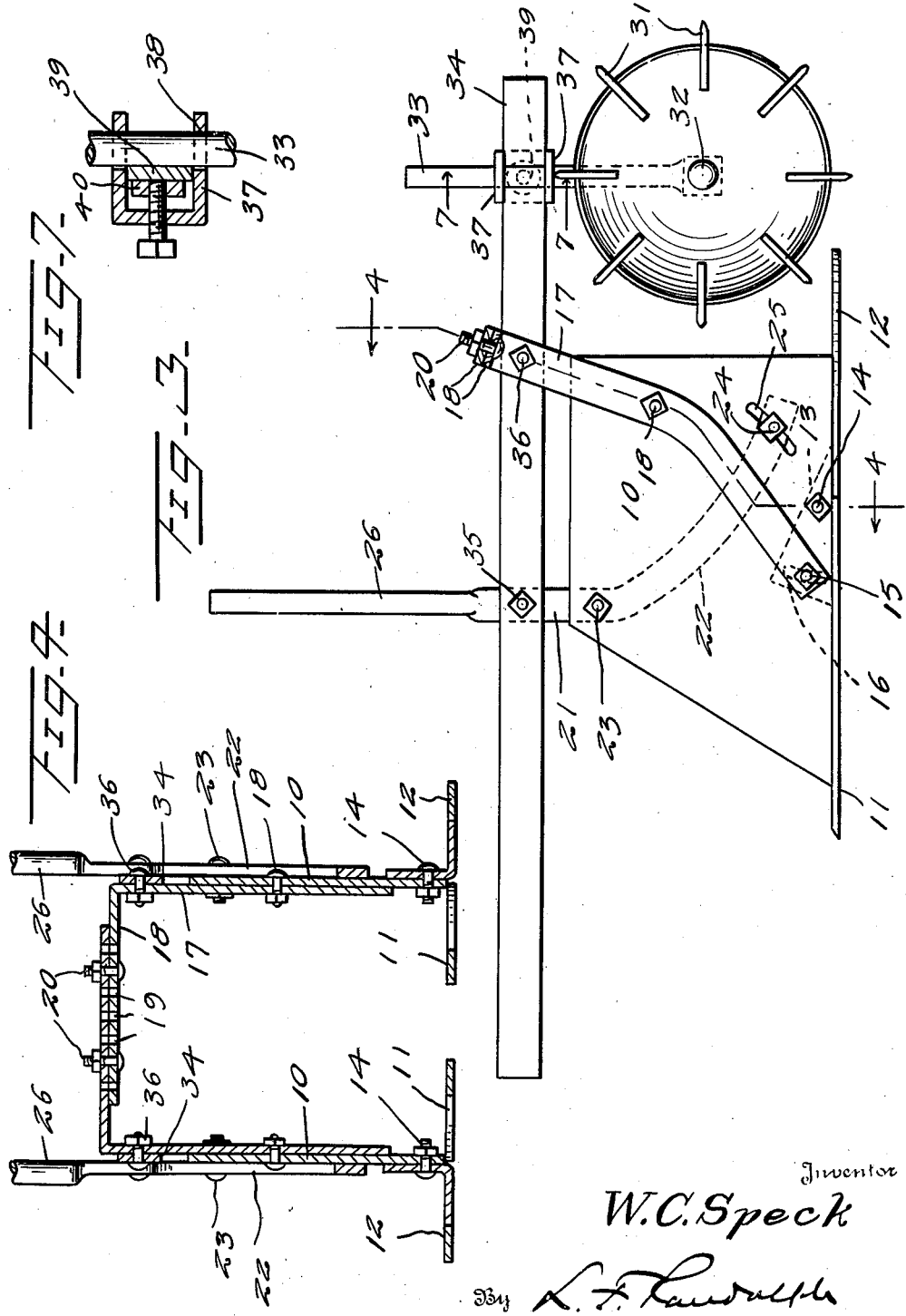

Sept. 21, 1943.   W. C. SPECK   2,329,794
CULTIVATOR ATTACHMENT
Filed April 8, 1943   3 Sheets-Sheet 3
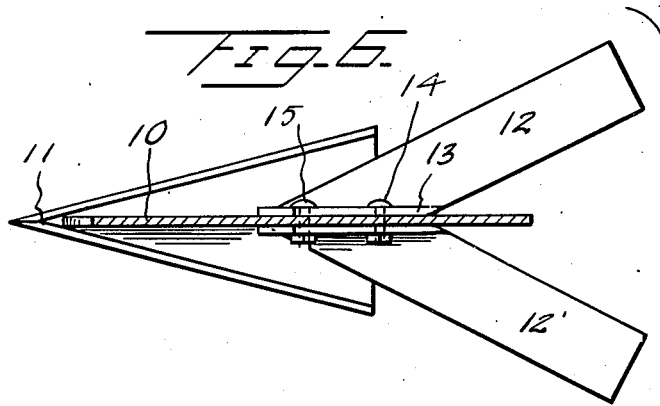
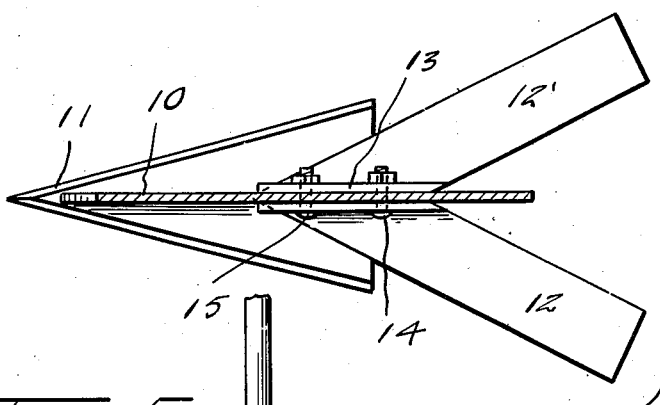
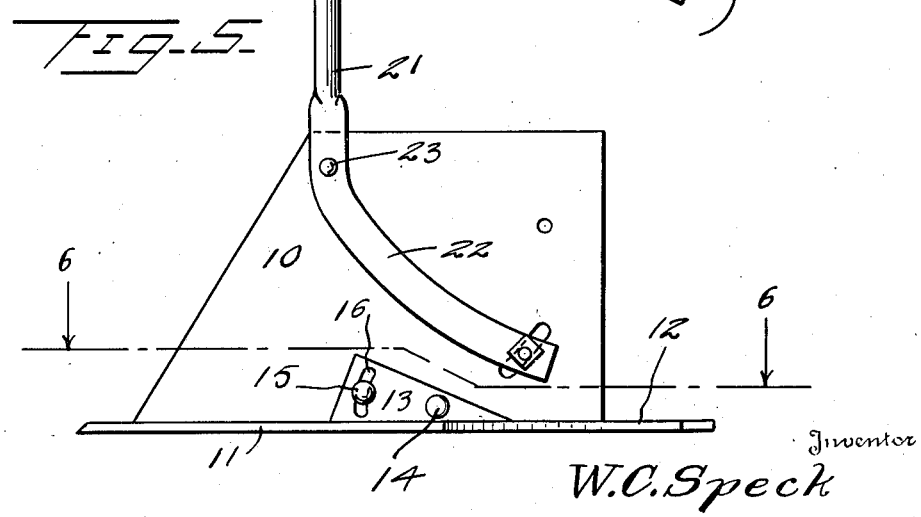
Inventor
W. C. Speck Patented Sept. 21, 1943

2,329,794

UNITED STATES PATENT OFFICE 2,329,794

CULTIVATOR ATTACHMENT

William C. Speck, Lamesa, Tex.

Application April 8, 1943, Serial No. 482,297

2 Claims. (Cl. 97—179)

My invention concerns wheeled cultivators and especially an attachment therefor for use in cultivating row crops like corn, cotton, and the like, to cut weeds, cultivate between the rows and to cultivate and remove weeds growing relatively close to the plant, for use in harvesting legumes like beans, peas, etc., in order to clip or cut the stem of the vines close to the ground.

I particularly aim to provide an attachment wherein the runners are mounted and reinforced in a novel and efficient manner by means which will permit relative adjustment of the parts to suit different widths of rows.

A further object is to provide novel disc means which effectively will remove soil which may have been shoveled onto plants, and also which will remove weeds, vines, trash, and the like away from the growing plant.

The structure is such as to permit its mounting on any standard type of cultivator.

The more specific objects and advantages will become apparent from a consideration of the description following taken in connection with accompanying drawings illustrating an operative embodiment.

In said drawings:

Figure 1 is a view showing my attachment in side elevation, operatively secured in place to a wheeled cultivator, the latter being shown fragmentarily;

Figure 2 is a plan view of the attachment alone;

Figure 3 is a vertical sectional view taken on the line 3—3 of Figure 2;

Figure 4 is a vertical section taken on the line 4—4 of Figure 3;

Figure 5 is a side elevation of one of the runner members and attached parts alone;

Figure 6 is a horizontal section taken on the line 6—6 of Figure 5; and

Figure 7 is a detail section taken on the line 7—7 of Figure 3.

Referring specifically to the drawings wherein like reference characters designate like or similar parts, I provide a pair of spaced-apart upright parallel runners or walls as at 10 which in operation are adapted to be on opposite sides of a row of the plants, thus straddling the plants.

Such runners 10 have fixed horizontal shoes or cutters 11 at their bases, with their side edges rearwardly diverging on opposite sides of the runners and being sharpened to constitute cutters. In the rear of the fixed cutters 11, removable and adjustable cutters 12 are provided, being disposed approximately in the same horizontal plane as the cutters 11 and diverging outwardly from the runners at an angle to the latter. Cutters 12 at their inner ends have upstanding triangular flanges 13 which are secured to the runners by bolts 14 and 15, the latter preferably passing through arcuate or elongated slots 16 of the flanges thus to enable adjustment of the cutters 12 on the axes 14.

If desired, as shown in Figure 6, I may provide additional cutters 12' in diverging relation to the cutters 12 and located between the runners and secured in place by the aforesaid bolts 14 and 15.

Generally diagonally-disposed bars 17 are bolted at 18 against the inner surfaces of the runners 10 and they have their lower ends secured in place by the passage of one of the bolts 15 therethrough. Such bars 17 have inwardly extending portions 18 at their tops forming overlapping straps provided with series of openings 19 adapted to register at different adjustments and to receive bolts 20 through registering openings. As a result of this construction, the runners 10 may be secured together at different distances apart dependent on the width of the plants and the rows.

Bars 21 have deflected portions 22 disposed against the outer sides of the runners 10 in cross relation to the bars 17, and the same are secured to such runners by bolts at 23 and 24, the latter preferably passing through arcuate or elongated slots 25 which facilitate adjustment. Such bars 21 include upwardly extending attaching shanks 26.

Said attaching shanks 26 are adapted to be detachably fastened by conventional clamps or couplings 26', removably and adjustably to the usual horizontal pair of spaced beams 27 of a conventional wheeled cultivator fragmentarily shown and designated 28, the wheel whereof which is illustrated being indicated at 29.

In order to remove from the plants, soil which may have been thrown thereagainst through the operation of the cultivator of the machine 28, and also to remove from adjacent the plants, weeds, vines, or the like, I provide discs 30, preferably one for each runner and the cutters thereof. These discs 30 are relatively large and extend practically to the plane of the cutters 11 and 12, and they preferably have radiating tines 31 to facilitate engagement with weeds, vines, and the like.

Said discs 30 are freely rotatable or journaled on studs 32 carried by standards 33 adjustably fastened to a longitudinal bar 34 bolted as at 35 and 36 removably to the shanks 26 and bars 17.

The means for adjustably fastening said standards 33 in place may consist of U-shaped brackets 37 having openings 38 in both legs through which standards 33 pass. Said brackets also enclose the bar 34 and adjusting bolts or screws 39 are threaded in the bridge of the brackets 37 and at their inner ends have heads 40 adapted to bind with the bar 34 and in turn cause it to bind against the standards 33.

It will be seen that in operation the cutters 11 and 12 will enter the ground on opposite sides of the row of growing plants, the latter thus being straddled, and will effectively cut and remove weeds, vines, or the like, moving them away from the plants, especially in combination with the discs 30 and their tines 31, the discs and tines efficiently breaking clods of the earth.

Various additional uses will be apparent, and changes may be resorted to within the spirit and scope of the appended claims.

I claim as my invention:

1. A cultivator attachment comprising spaced runners, knives at the bases of said runners, bars on the inner sides of said runners, bars on the outer sides of said runners in cross relation to the first-mentioned bars, means adjustably securing one set of bars together, and the other set of bars having means thereon for attachment to a cultivator, consisting of upwardly extending attaching shanks, bars secured to the attaching shank and to the bars in the rear thereof, and clump-breaking discs rotatably mounted on the third-mentioned bars.

2. A cultivator attachment comprising spaced runners, knives at the bases of said runners, bars on the inner sides of said runners, bars on the outer sides of said runners in cross relation to the first-mentioned bars, means adjustably securing one set of bars together, and the other set of bars having means thereon for attachment to a cultivator, consisting of upwardly extending attaching shanks, bars secured to the attaching shanks and to the bars in the rear thereof, and clump-breaking discs rotatably mounted on the third-mentioned bars, by means of standards to which they are pivoted, brackets through which the standards pass, said brackets surrounding the third-mentioned bars, and binding elements passing through the brackets and binding the third-mentioned bars and standards together.

WILIAM C. SPECK.